United States Patent [19]

Roberts

[11] Patent Number: 4,710,249
[45] Date of Patent: Dec. 1, 1987

[54] TIRE REPAIR METHOD

[76] Inventor: Simon Roberts, 30543 Shoreham, Southfield, Mich. 48076

[21] Appl. No.: 751,296

[22] Filed: Jul. 2, 1985

Related U.S. Application Data

[62] Division of Ser. No. 592,506, Mar. 26, 1984, Pat. No. 4,579,161.

[51] Int. Cl.$^4$ ............... B60C 21/06; G01B 5/12
[52] U.S. Cl. ............... 156/64; 81/15.7; 138/98; 152/370; 156/97; 156/267; 206/582; 411/510; 411/542
[58] Field of Search ............... 152/370, 429, 430; 156/97, 95, 64, 267; 81/15.7, 15.5; 206/582; 411/509, 510, 542; 138/98; 33/169 R

[56] References Cited

U.S. PATENT DOCUMENTS

| | | | |
|---|---|---|---|
| 570,942 | 11/1896 | Merritt | 152/370 |
| 594,066 | 11/1897 | Cluxton | 152/370 |
| 609,901 | 8/1898 | O'Neill | 152/370 |
| 2,095,931 | 10/1937 | Kraft | 152/370 |
| 2,727,554 | 12/1955 | Westfall | 152/370 |
| 4,279,343 | 7/1981 | Alfanta | 152/370 |

*Primary Examiner*—Donald E. Czaja
*Assistant Examiner*—Thomas Bokan
*Attorney, Agent, or Firm*—Rhodes and Boller

[57] ABSTRACT

A method and closure are provided for sealing and repairing a puncture of a tire. The closure is a resilient plug of a rubber-like material stiffer and more durable than prior closures having a generally cylindrical shank portion and an adjoining circular head portion. The periphery of the shank portion has a labyrinth of closely spaced sealing rings and grooves therebetween. When the shank portion is forcibly engaged with a puncture, the sealing rings individually radially compress and locally conform to the size and shape of the puncture thereby providing multiple sealing members with the puncture. Additional sealing is provided by an auxiliary sealing ring on the head portion of the closure which is adhesively bonded to the inner surface of the tire, adjacent to the puncture. Tool attaching means are provided on the closure for forcibly engaging the closure with the puncture. The method of repair includes the steps of selectively matching the size of the aforedescribed closure with a puncture, applying an adhesive to the periphery a body and lower head surface of the closure, affixing an assembly tool to the closure, forcibly inserting the closure into the puncture and trimming excess material from one end of the closure.

9 Claims, 11 Drawing Figures

TIRE REPAIR METHOD

This is a division of application Ser. No. 592,506, filed Mar. 26, 1984, now U.S. Pat. No. 4,579,161.

BACKGROUND OF THE INVENTION

The present invention is related to the art of tire repair and more particularly to an improved method and tire repair plug for repairing and sealing punctures of vehicle tires.

Although various styles of tire repair plugs are found in the prior art, none have been fully accepted by the public as a reliable means for repairing and sealing punctured tires. Consequently, punctured tires are often discarded, or after being repaired are used only as spares, at great expense to their owners.

Heretofore, tire repair plugs have been characterized by soft highly flexible smooth bodies of rubber-like materials. In the common method of repair in present use an adhesive is applied to a thin smooth headless strip of a soft highly flexible rubber-like material. The strip is then folded, forcibly elongated and inserted into a puncture. During the insertion of the strip into the puncture, the soft flexible material is substantially deformed to conform to the puncture and a portion of the adhesive is wiped away from the smooth surface of the strip.

One undesirable consequence of the present practice is that sealing effectiveness and repair reliability vary with differences in puncture size and shape.

Another undesirable consequence is that the quality of the repair is dependent upon the skill of the repairman.

Another undesirable consequence is that a portion of the adhesive is wiped away from the smooth outer surface of the plug during its insertion into the puncture.

Another undesirable consequence is that the soft flexible material reduces the durability of the repair plug and is easily penetrated by the ends of broken steel cords of radial tires which protrude into the puncture.

Among the remaining prior art, Cluxton, U.S. Pat. No. 594,066 (November, 1897), discloses a repair plug for sealing a puncture made of a highly flexible material, having a smooth tubular stem and adjoining hollow head, the head portion thereof being forcibly elongated and passed through a puncture.

O'Neill, U.S. Pat. No. 609,901 (August, 1898), discloses a multi-piece tire repair plug for sealing a puncture. One piece, made from a highly flexible material, has a smooth cylindrical stem portion, for engaging in sealing relationship a puncture of a tire, and an adjoining thin circular disc portion. The other piece, a heavier more rigid disc portion, is joined to the perimeter of the flexible disc portion of said first piece.

Kraft, U.S. Pat. No. 2,095,931 (October, 1937), discloses a repair plug for sealing a puncture of a pneumatic tube, made from a highly flexible material, having a smooth hollow conical stem portion and an adjoining thin circular head portion. In making a repair, the smooth conical stem portion is forcibly elongated and passed through the puncture.

BRIEF DESCRIPTION OF THE INVENTION

The present invention is an improved tire repair plug and method for repairing and sealing a puncture of a vehicle tire. The improved repair plug is characterized by a labyrinth of closely spaced arcuate sealing rings on the periphery of a generally cylindrical body and includes a tool engaging means for forcibly inserting the plug into a puncture of a tire. Between adjacent sealing rings circumferential grooves provide space for the portions of the sealing rings which are displaced when the plug is forcibly inserted into a puncture. The grooves further provide storage space for adhesive applied to the body of the plug. During a forcible insertion of the plug into a puncture, the peripheral sealing rings individually compress radially inwardly and locally conform to the size and shape of the puncture.

In the improved method, sealing effectiveness and reliability are improved by a standardized procedure which precisely matches the improved repair plug with a puncture. The initial step of selecting an appropriate size plug consists of inserting slender rod shaped graduated size gages, corresponding to plug sizes, into a puncture. Thereafter, an adhesive is applied to the peripheral sealing rings and grooves therebetween by a suitable means, such as, brushing or dipping. An installation tool is next engaged with the appropriate size plug and thereafter the plug is forcibly inserted into the puncture. The final steps consist of disengaging the tool and trimming excess material, if any, from the plug.

It is a primary object of the invention to improve the quality and reliability of tire repairs.

Another object, in addition to the foregoing object, is to permit the use of higher rate, more durable materials, in tire repair plugs.

Another object, in addition to the foregoing objects, is to reduce the loss of adhesive from a tire repair plug during its insertion into a puncture of a tire.

Another object, in addition to the foregoing objects, is to provide a reliable method of repairing punctured tires which is not dependent upon the skill of the repairman.

Another object, in addition to the foregoing objects, is to provide a convenient and inexpensive means for repairing punctured tires.

Additional features, benefits and objects of the invention will become apparent from the ensuring description and accompanying drawings which disclose the invention in detail. A preferred embodiment is disclosed in accordance with the best mode contemplated in carrying out the invention and the subject matter in which exclusive property rights are claimed as set forth in each of the numbered claims at the conclusion of the description.

DESCRIPTION OF THE PREFERRED EMBODIMENT

Figure 1:
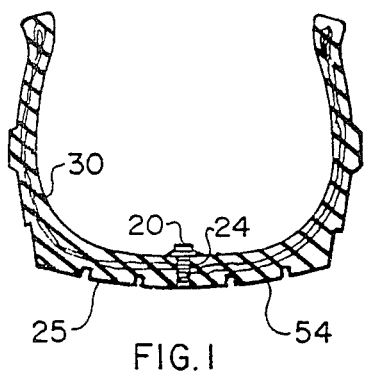
FIG. 1 is a radial cross-sectional view through a typical vehicle tire which has been repaired with the improved repair plug.

Referring now to the drawings wherein like reference characters refer to like and corresponding parts throughout the several views, the particular repair plug 20 disclosed therein includes a generally cylindrical resilient body portion 21, made of a suitable rubber-like material, having a labyrinth of closely spaced arcuate sealing rings 22 on the periphery thereof and a tool engaging means 23 for forcibly inserting the body portion 21 into a puncture 24 of a tire 25.

Figure 3:
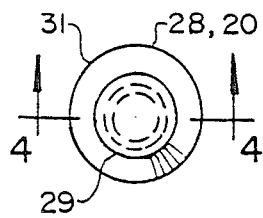
FIG. 3 is a plan view of the tire repair plug shown in FIGS. 1 and 2.
Figure 4:
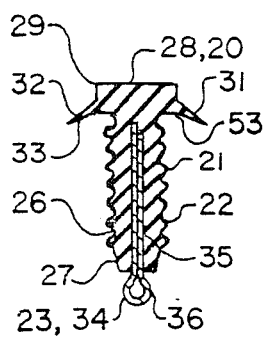
FIG. 4 is a cross-sectional view taken along the line 4—4 of FIG. 3.

With reference to FIGS. 3 and 4, the sealing rings 22 being an important feature of the invention, are disposed centrally about the axis of the plug 20 and normal to said axis. One effect of the sealing rings 22 is a substantial reduction over existing repair plugs in the elastic rate in radial compression of the body portion 21. This is so because the compression rate of a part of a rubber-like material is highly dependent on the shape of the part. Whereas shape has only a minor effect on the rates in shear and tension of the part, its compression rate, to a large degree, varies with the ratio of the load area to the free area of the part, commonly referred to as the "bulge area" of the part.

Inasmuch as the sealing rings 22 lower the radial compression rate of the repair plug 20 over existing smooth bodied plugs, by reducing load area and increasing free area, one benefit of the invention is that stiffer more durable materials than heretofore possible may be used for the repair plug 20.

Another benefit of the invention is that each of the sealing rings 22 is free to compress radially inwardly when the body portion 21 is forcibly inserted into the puncture 24 and thereby locally conform to size and shape of the puncture 24. As a result of the improved fit of the plug 20 and puncture 24, the quality and reliability of a repair is substantially improved over repairs with existing repair plugs.

Between adjacent sealing rings 22 are the circumferential grooves 26 which are concentric with the rings 22 and normal to the axis of the plug 20. During the insertion of the body portion 21 into the puncture 24, the grooves 26 accommodate displaced portions of the sealing rings 22 and reduce the wiping away of an applied adhesive from the body portion 21 by providing space for the adhesive.

Figure 2:
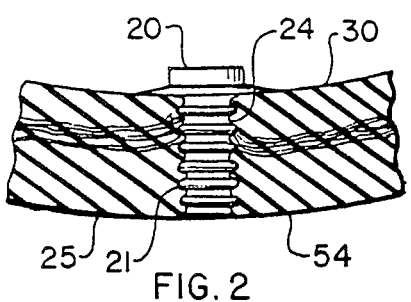
FIG. 2 is an enlarged fragmentary view of FIG. 1 showing the improved repair plug.

One end portion 27 of the body portion 21 is preferably conical to ease the entry of said body portion 21 into the puncture 24. In the particular embodiment 28 of FIGS. 3 and 4 which is especially adapted to be inserted into the puncture 24 from the inside of the tire 25 a circular head portion 29 adjoins the other end portion of the body portion 21. The circular head portion 29 is concentric with the body portion 21 and normal to the axis thereof. As shown in FIGS. 1 and 2, the circular head portion 29 is a positive stop for insertion of the plug 28 into the puncture 24 and provides sealing to the inner tire surface 30 surrounding the puncture 24.

The circular head portion 29 preferably has a thin outwardly projecting auxiliary sealing ring portion 31 having intersecting upper 32 and lower 33 faces. The auxiliary sealing ring portion 31 is sloped slightly downwardly to fully contact the lower face 33 thereof against the inner surface 30 of the tire 25 when the body portion 21 is forcibly inserted into the puncture 24 and the head portion 29 firmly pressed against the inner tire surface 30.

The tool engaging means 23 disclosed in FIG. 4 consists of an axially disposed thin folded metal wire insert 34 having a pair of contiguous straight segment portions 35 and an interconnecting loop end portion 36 which projects outwardly from the conical end portion 27 of the body portion 21. The folded wire insert 34 is fixedly attached to the body portion 21 by bonding the straight segment portions 35 to the interior of the body portion 21.

Figure 9:
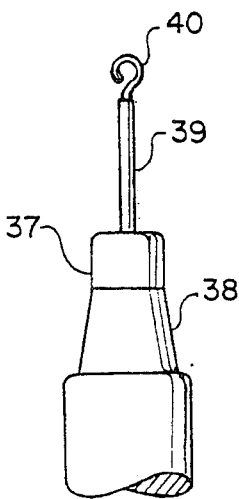
FIG. 9 is a side elevational view of an installation tool for forcibly inserting the repair plug of FIG. 3 into a tire puncture.

A suitable tool 37 for inserting the body portion 21 into the puncture 24 is disclosed in FIG. 9 as comprising a generally cylindrical handle portion 38 and an axially disposed adjoining shank portion 39 having a hook portion 40 at the distal end thereof for engaging the wire loop portion 36 and pulling the body portion 21 into the puncture 24.

Figure 5:
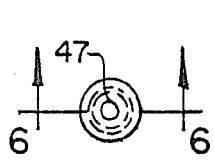
FIG. 5 is a plan view of an alternate embodiment of the improved tire repair plug.
Figure 7:
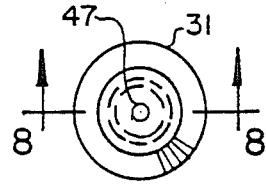
FIG. 7 is a plan view of a second alternate embodiment of the improved tire repair plug.
Figure 6:
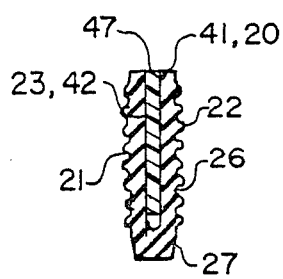
FIG. 6 is a cross-sectional view taken along the line 6—6 of FIG. 5.
Figure 10:
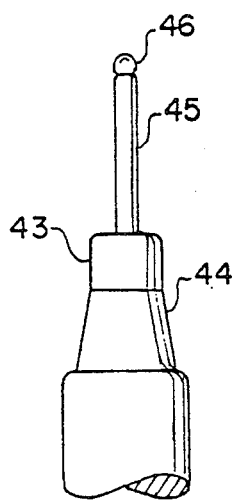
FIG. 10 is a side elevational view of an installation tool for forcibly inserting the repair plug of FIGS. 5 and 7 into a tire puncture.

Referring to FIGS. 5 and 6, a headless embodiment 41 is disclosed therein for repairing the tire 25 by inserting the repair plug 41 into the puncture 24 from the outside of the tire 25. The tool engaging means 42 thereof is an axially disposed circular recess 42 which extends partially into the repair plug 41. In FIG. 10 is disclosed a suitable tool 43 for inserting the repair plug 41 into the puncture 24 comprising a generally cylindrical handle portion 44 and an adjoining shank portion 45 having a spherical portion 46 at the distal end thereof for engaging the circular recess portion 42 and pushing the body portion 21 into the puncture 24.

Figure 8:
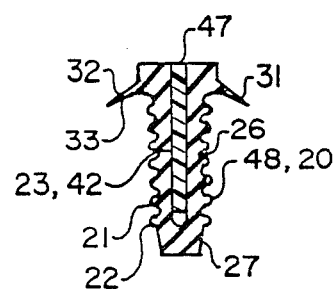
FIG. 8 is a cross-sectional view taken along the line 8—8 of FIG. 7.

After the forcible insertion of the plug 41 into the puncture 24 a slender rod shaped core 47, made of a suitable rigid material or a resilient material having a higher rate than the plug 41 is inserted and adhesively bonded to the circular recess 42 of the plug 41. As shown in FIG. 8, the circular recess 42 and the rod shaped core 47 can be substituted for the folded wire insert 34 of the embodiment 28 disclosed in FIGS. 3 and 4.

Heretofore, the quality and reliability of sealing tire punctures with repair plugs have depended, to some degree, on the skill of a repairman and a substantial deformation of a soft highly flexible material. With the foregoing in mind, an improved method of repair which controls the amount of deformation of the peripheral sealing rings would further satisfy the objects of the invention.

Using the particular embodiment 28 disclosed in FIGS. 3 and 4, by way of illustration, the initial step in the improved method consists of selecting an appropriate size repair plug 28, by inserting slender rod shaped gage members 51 into the puncture 24, said gage members 51 being referenced to optional size repair plugs 28.

Figure 11:
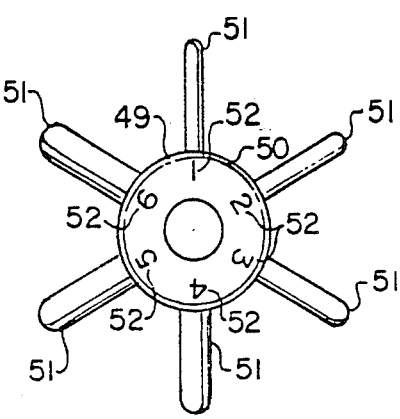
FIG. 11 is a plan view of a gage for determining the appropriate size of the improved repair plug for sealing a tire puncture.

A suitable gage 49 is disclosed in FIG. 11 as having a circular housing 50 with radially spaced slender rod shaped gage members 51 fixedly attached to the periphery of said housing 50 and projecting outwardly therefrom. On the housing 50, opposite the inner portions of the gage members 51, are reference characters 52 which correspond to the optional size repair plugs 28. By determining the largest diameter gage member 51 which can be inserted into the puncture 24 without excessive force, the appropriate plug corresponding to the reference character 52 of said gage member 51 is selected.

Thereafter, a suitable adhesive is applied to the plug body portion 21 and the adjoining surface 53 of the plug head portion 29 by dipping or brushing so as to fully coat the sealing rings 22 and grooves 26 therebetween and said head surface 53. After applying said adhesive, the shank portion 39 of the tool 37 is inserted from the outside of the tire 25 through the puncture 24 and connected to the repair plug loop portion 36.

The plug body portion 21 is next forceably inserted into the puncture 24 and the plug head portions 29 firmly seated against the tire inner surface 30 by withdrawing to tool 37 from the puncture 24. The tool 37 is then detached from the plug wire loop portion 36 and as a final step excess material, including the plug wire loop portion 36 trimmed away so that the end of the plug 28 is flush with the outer tire surface 54, using a suitable hand tool (not shown).

With reference to the particular embodiments 41, 48 shown in FIGS. 6 and 8, respectively, wherein the tool engaging means 42 consists of a circular recess 42, the number of optional size plugs 41, 48 may be reduced by providing alterate size cores 47 and expanding the plugs 41, 48 to accommodate the sizes of the punctures 24.

Although but three embodiments of the invention have been disclosed in detail herein, it is obvious that many changes may be made in the size, shape, arrangement and detail of the various elements of the invention, all without departing from the spirit and scope thereof as defined by the appended claims.

I claim:

1. A method of repairing and sealing a puncture of a tire comprising:
    (a) inserting into a tire puncture alternate rigid slender rod shaped members to measure the size of said tire puncture, said rigid rod members being indexed to corresponding sizes of a series of resilient plug type closures;
    (b) selecting a corresponding size closure from the series of closures;
    (c) engaging a tool with the closure; and
    (d) forcibly inserting the closure into the puncture by using the tool.

2. The method of repairing and sealing a puncture of a tire according to claim 1 wherein said closure is forcibly engaged with the puncture from the outside of the tire.

3. The method of repairing and sealing a puncture of a tire according to claim 1 wherein said closure is forcibly engaged with the puncture from the inside of the tire.

4. The method of repairing and sealing a puncture of a tire according to claim 2 wherein said hand tool is engaged with an aperture of the closure.

5. A method of repairing and sealing a puncture of a tire comprising:
    (a) measuring the size of a puncture of a tire by inserting alternate size rigid gage members into said puncture, each of said gage members corresponding to an optional size resilient plug closure;
    (b) selecting a plug closure from among said optional size closures, said selected closure corresponding to the rigid gage member which matches the size of the puncture;
    (c) applying an adhesive to the plug closure; and
    (d) forcibly inserting the plug closure into the puncture of the tire.

6. The method of repairing and sealing a puncture of a tire according to claim 5 further comprising the trimming of excess material from one end of the closure.

7. The method of repairing and sealing a puncture of a tire according to claim 5 wherein said resilient plug closure has a labyrinth of closely spaced arcuate sealing rings on the periphery thereof which radially compress when said closure is forcibly inserted into the puncture.

8. A method of repairing and sealing a puncture of a tire comprising:
    (a) inserting into a tire puncture alternate rigid slender rod shaped members to measure the size of said tire puncture, said rigid rod members being indexed to corresponding sizes of a series of resilient plug type closures;
    (b) selecting a resilient closure corresponding to the rigid slender rod shaped member corresponding to the size of the puncture of a tire, said closure having a labyrinth of closely spaced sealing rings with concentric grooves therebetween integral with the periphery thereof and a tool engaging means for connecting an assembly tool;
    (c) applying an adhesive to the periphery of said closure;
    (d) connecting an assembly tool to said tool engaging means;
    (e) forcibly engaging said closure with said puncture whereof said sealing rings individually radially compress and provide multiple sealing members for locally conforming to and sealing said puncture in combination with said adhesive; and
    (f) trimming excess material from one end of said closure.

9. A method of repairing and sealing a puncture of a tire comprising:
    (a) inserting a gage having multiple slender rigid rod shaped members into a puncture of a tire to measure the size of the puncture, each of said rigid rod shaped members corresponding to a predetermined size resilient plug closure;
    (b) selecting a corresponding size plug closure, having a labyrinth of closely spaced sealing rings on the periphery thereof and a circular recess aligned with the axis of the closure, from a series of closures corresponding to the sizes of said rigid rod shaped members;
    (c) applying an adhesive to the resilient plug closure;
    (d) forcibly engaging said closure with the puncture to individually radially compress the sealing rings and provide multiple sealing members which locally conform to and seal said puncture in conjunction with said adhesive; and
    (e) inserting a core into the circular recess of the closure.

* * * * *